(12) United States Patent
Eriksson

(10) Patent No.: US 6,379,483 B1
(45) Date of Patent: Apr. 30, 2002

(54) APPARATUS AND METHOD FOR SEALING A TUBULAR CONTAINER

(76) Inventor: Vilho Eriksson, Östra Henriksborgsvägen 45, Nacka 13131 (SE)

( * ) Notice: Subject to any disclaimer, the term of this patent is extended or adjusted under 35 U.S.C. 154(b) by 0 days.

(21) Appl. No.: 09/600,863

(22) PCT Filed: Feb. 10, 1999

(86) PCT No.: PCT/SE99/00176

§ 371 Date: Jul. 27, 2000

§ 102(e) Date: Jul. 27, 2000

(87) PCT Pub. No.: WO99/39979

PCT Pub. Date: Aug. 12, 1999

(30) Foreign Application Priority Data

Feb. 10, 1998 (SE) .............................. 9800382
Dec. 8, 1998 (SE) .............................. 9804255

(51) Int. Cl.$^7$ .............................................. B65B 51/22
(52) U.S. Cl. .................. 156/73.1; 156/73.3; 156/251; 156/515; 156/580.1; 156/580.2
(58) Field of Search ............................. 156/73.1, 73.3, 156/250, 251, 292, 308.2, 308.4, 510, 515, 530, 580.1, 580.2; 493/189, 203, 209, 239

(56) References Cited

U.S. PATENT DOCUMENTS

| 3,770,122 A | | 11/1973 | Thiele .......................... 206/84 |
| 4,289,569 A | * | 9/1981 | Rabeneck et al. ........ 156/580.2 |
| 4,304,615 A | * | 12/1981 | Siegel ......................... 156/73.3 |
| 4,419,790 A | | 12/1983 | Niedecker ....................... 17/35 |
| 4,517,790 A | * | 5/1985 | Kreager ........................ 53/552 |
| 4,534,818 A | * | 8/1985 | Kreager et al. .............. 156/466 |

FOREIGN PATENT DOCUMENTS

| CA | 1206936 | 7/1986 |
| EP | 0014021 A1 | 8/1980 |
| FR | 1215198 | 4/1960 |
| GB | 739152 | 10/1955 |
| GB | 1129682 | 10/1968 |
| GB | 2158615 A | 11/1985 |
| SE | 462214 | 5/1990 |
| SE | 468802 | 3/1993 |
| WO | WO97/02182 | 1/1997 |

\* cited by examiner

*Primary Examiner*—James Sells
(74) *Attorney, Agent, or Firm*—Jacobson Holman, PLLC

(57) ABSTRACT

The invention solves in a new manner the known problems of making packages in the form of a continuous tube completely and reliably tight though a method, which is mainly distinguish by the tube being pressed together at the constricting positions into a string and that the string along plural lines are subjected to high and preferably pulsating pressure of such a magnitude that the material becomes adhering. The lines may be traversal with respect to the tube ot crossing each other so as to form a checked pattern. The pulsation in pressure is suitably obtained through ultrasound. The invention concerns a device as well as a sealing method.

15 Claims, 2 Drawing Sheets

APPARATUS AND METHOD FOR SEALING A TUBULAR CONTAINER

Figure 1:
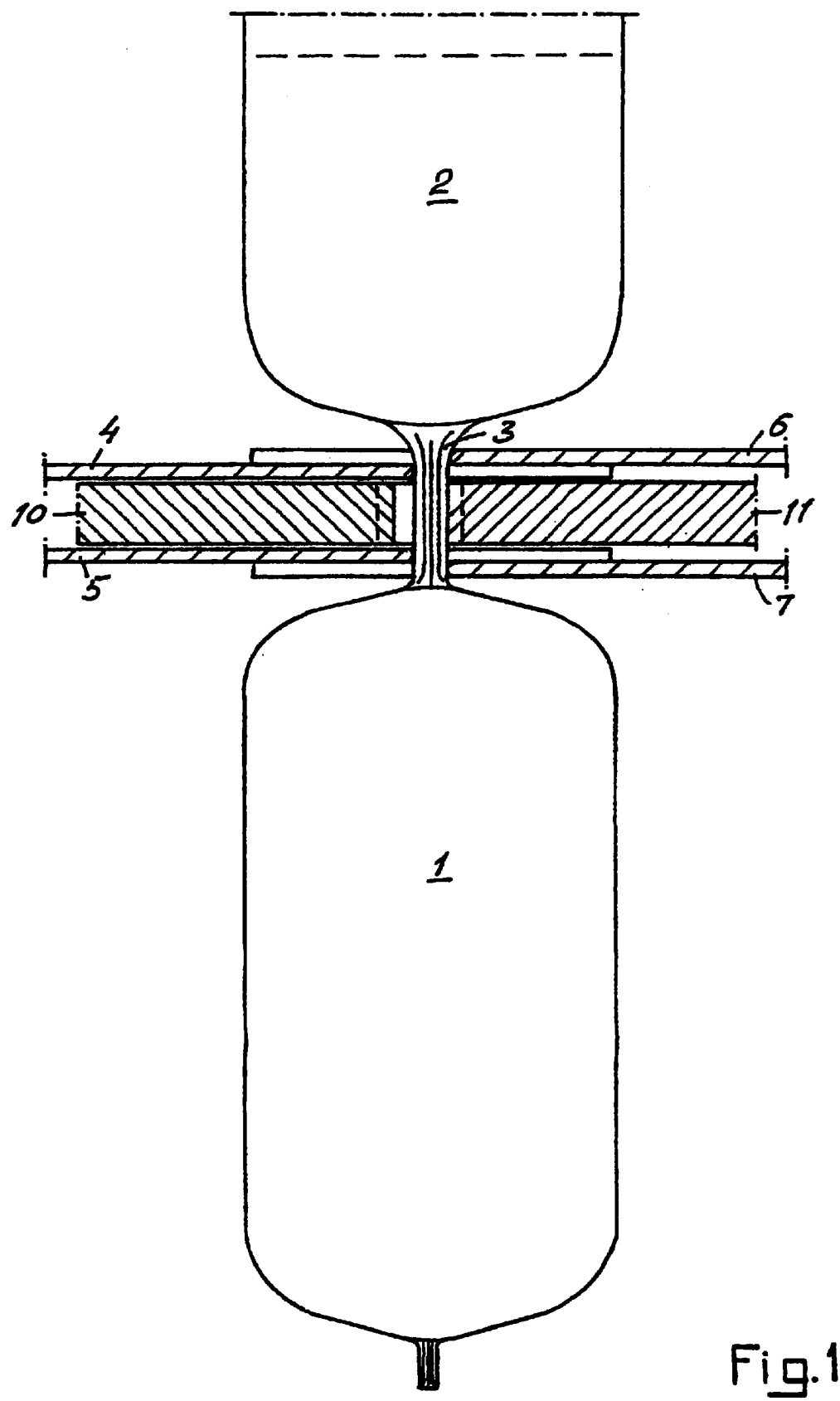

This invention concerns a device and method for sealing a package according to the preamble of claim 1 and 6, and 7, respectively.

For many kinds of goods, mainly foodstuffs, the continuous tube package, which is formed and continuously filled and regularly constricted, is the absolutely most rational package type. Hereby the package material at each end is collected into a small string, which is sealed with metal clamps or clips. Its weakness is that end closures, formed at the cut off, demands the use of these metal clamps, which still do not guarantee a tight closure. The clamps, further, comprise an economic drawback by their costs and by complicating material recycling.

It is an object of the invention to eliminate the drawbacks of the prior art and to provide a device and a method according to the above, which allow perfected production of seals for tube shaped packages.

This invention particularly concerns an essentially faster and thereby more economic method of making durable heat sealing of the tube material.

According to a first aspect of the invention this is obtained by using tube material including plural plastics having different melting points and applying ultrasound to the compressed string in a device, which is mainly characterised in that the V-shaped tool parts are arranged on each side of the string and movable in pairs against each other in a transverse direction with respect to the string, that the tool part pairs have a mutual distance of 15–25 mm in the longitudinal direction of the string and that between the pairs there are arranged on the one hand two supporting surfaces for the opposite sides of the string, on the one hand two jaws, which are displaceable against each other for ultrasound hammering the string. In a particularly preferred embodiment, at least one of the jaws is provided with ridges which extend essentially transversally with respect to the string, or in a checked pattern. The jaws may further include a cutting edge tool for cutting the string at the end phase of its closure.

The sealing problems of such tubular packages are thus completely solved through this invention. The filled tube may be end sealed, reliably as well as gas tight, even without the use of additives. According to a second aspect of the invention this is achieved through a method, which is mainly characterised in that the tube is produced from a material including a meltable layer, that the string at the constricting positions are pressed together into a string, and that the string along plural lines is subjected to a high and preferably pulsating pressure of such a magnitude that the meltable layer in the material will become temporarily adhesive. This adhesion will be permanent when the material has been allowed to cool.

It is preferred that the tube is manufactured from a material consisting of several layers having different melting temperatures, whereby the more easily melting layers or the material will provide the adhesion.

Thorough investigation of the process when end sealing tubular packages has revealed that bars of today against a safe and economic working method generally are of two kinds. On the one hand it concerns the difficulty to remove, from the sealing spot, all remains of the contents of the tube, on the other hand about unavoidable variations of the temperature in the different layers of the tube material resulting from heat applied from the outside. Even though the remaining contents being retained in the sealing area seem not to be of any importance, they do present a risk of leakage, hitherto only somewhat being controllable by the application of two metal clamps at each constriction of the tube. According to the invention the impact of the remains to the tightness of the closure is eliminated by the sealing function being distributed to several lines, between which possible remaining contents may be displaced by the pressure at the linear closure positions. It is thereby sufficient if the lines are extending in parallel to each other and transversally with respect to the longitudinal direction of the tube, but if the lines are arranged to form a checked pattern, their effect may be further enhanced so as to solve particularly difficult problem cases. It is further very important that by the arrangement of sealing at plural lines, melting material to achieve the adhesion is collected within the area of the closure and is retained there, which guarantees that the bonding or adhering material does not escape from this area.

Each constriction includes two sealing places, each having to have any of the described line arrangements. Between these places, the lengths of which will amount to about 5–7 mm each, a distance of some millimeters may be left unaffected and soft in order that after cutting it must not comprise a sharp and thereby risky point.

The best result concerning tightness as well as economy is achieved with the method according to the invention by using ultrasound for providing pulsating pressure. Thereby firstly, a maximum pressure is applied so as to transport the remains from the lines and at the same time cold-shape the tube material. Immediately and following that, the sealing is achieved with the aid of the ultra-sound which in a known manner heats the tube material and under a pressure, which may be somewhat longer than the initial pressure, will melt it together within a fraction of a second. At that process the softer layer in the tube material will act as a melt and adhere in lines to the other layers and encloses the remains of the contents of the package between the lines. The lines may be parallel and transverse with respect to the tube or be crossing each other and form a checked pattern. The number must be at least four for every constricting position, preferably more, and they can with advantages be obtained with a correspondingly patterned stamp, working against an anvil. Also the anvil may be patterned in the same way. The anvil may preferably be held at a constant temperature with the aid of a cooling device and a thermostat. The choice of materials of the different layers of the tube must of course follow the demands set by the contents of the package, but it could be mentioned as an example that for food stuffs, has been used advantageously: the combination polyethylene-polypropylene-polyethylene as well as metallocen-polyethylene-polyamide-polyethylene-metallocen. All layers must not consist of a plastics material. Also less expensive material which is coated with a plastic material may be used if this is allowed with respect to the contents of the package. Plastic coated metal foil may be used for light sensitive goods.

Suitable material choices for the stamp and the anvil, for carrying out the method is, polytetrafluorethylene (teflon) or teflon covered aluminum, and for the stamp a metal, preferably titanium. Also the stamp may be held at a constant temperature with the aid of cooling means and a thermostat.

Within the scope of the invention is also that the pressure lines may consist of lines of points and depressions near each other.

Figure 2:
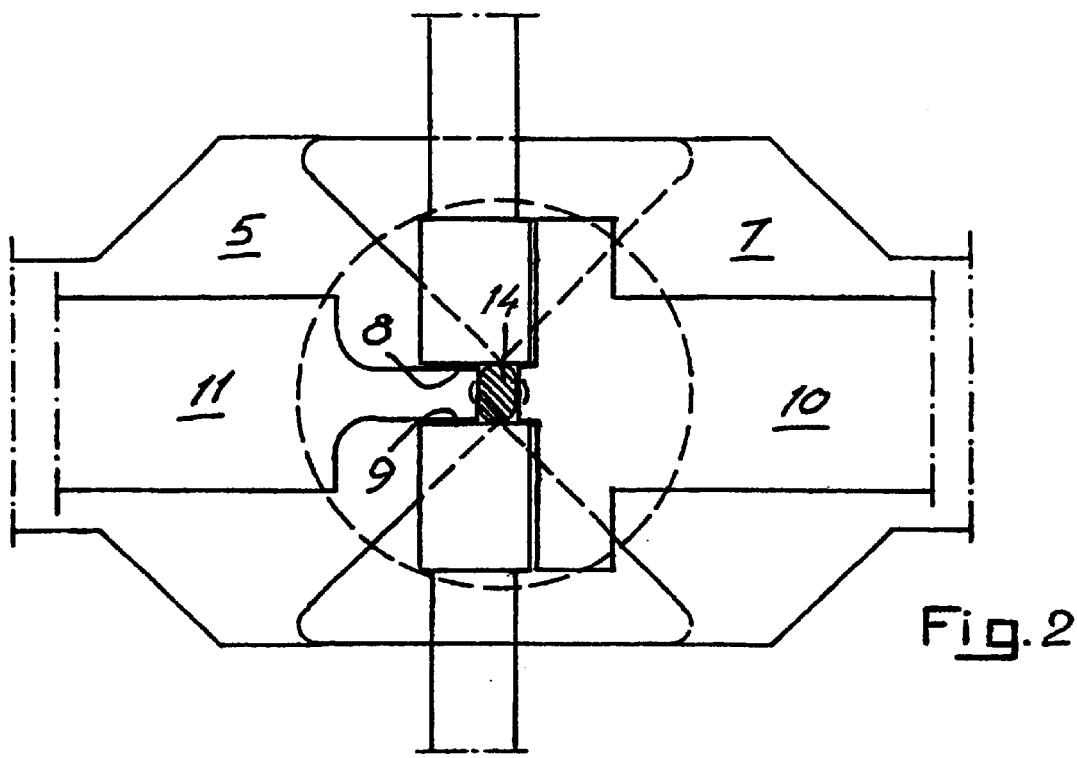
Figure 3:
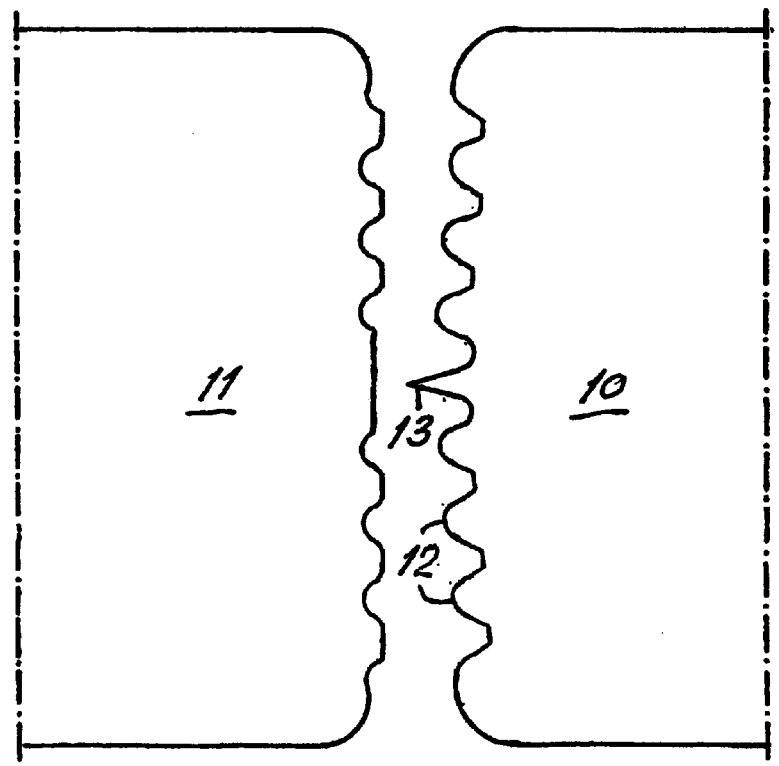

The invention will now be described closer with reference to an embodiment according to the annexed drawings, wherein FIG. 1 shows the device according to the invention in a side view FIG. 2 shows the device in a plan view FIG. 3 shows the ultrasound jaws in detail.

From FIG. 1 it is clear how an already filled tube package 1 and a similar package 2 during filling are connected with each other through a string 3 of tube material. The string 3 is surrounded by the pairs of V-shaped tool parts 4, 5 and 6, 7, which are located at a mutual distance from each other of 16 mm. Within the pairs the parts are moveable to and from each other. Their shape and position is also shown in FIG. 2. Between the pairs there are on the one hand two blocks of teflon which with their supporting surfaces 8 and 9, respectively, are capable of holding the string 3 collected, on the other hand two jaws 10, 11 for ultrasound hammering the string. Also the jaws are moveable to and from each other. The one jaw 10 serves as an anvil and may be made of steel or titanium, whereas the other jaw 11 serves as an ultra sonic horn by being connected to a, here not shown, previously known ultrasound generator having an effect on about 1 kW and the frequency 20–40 kHz. The ultra sonic horn 11 should be made of titanium. Both jaws 10, 11 may be even on the surfaces which are turned against each other, but an essentially better result will be obtained if the surfaces are provided with ridges 12 in the way shown in FIG. 3, or with a checked pattern. The jaw 10, serving as an anvil, is further preferably provided with a sharp cutting edge 13 at the middle, having such a height that it will abut the ultra sonic horn 11, while there is still an intermediate space of some tenth of a millimeter between the jaws. In order to obtain the most suitable movement sequence for tool parts, the teflon blocks and the jaws are coupled to hydraulic or air pistons which in a per see known way are controlled by valves in separate supply conduits from a pump or a compressor having a pressure tank. The teflon blocks may thereby be arranged to synchronously participate in the movement of the anvil 10 by being rigidly connected thereto. In order to relieve the sealed portion when it cools down, support for the finished package may be arranged at its side, for example such as suction cups. The method of function is according to the following.

At the start of a working period, the end of a package tube is brought from above in between tool parts 4, 5, supporting surfaces 8, 9, jaws 10, 11 and tool parts 6, 7, which all are at a maximum mutual distance within the respective pair. The tube consists of laminated or co-extruded plastics having somewhat different melting points, which are distributed so that between the inner and the outer plastic player there is at least one layer having a lower melting point. When the device thereafter is manoeuvred to operation "sealing", firstly the tool parts 4, 5 and 6, 7, respectively, are moving against each other and thereby through the V-shape collect the tube into a string. Also the blocks with supporting surfaces 8, 9 and jaws 10, 11 are moving closer to each other so that they in pairs, from different directions, support and hammers the string, respectively. As a result of the hammering, the string is both heated and compressed to a homogenous and very strong plastic band 14 having the dimensions 1.5–2×5–15 mm. In the final phase of the operation, the cutting edge 13 is pressed against the jaw 10 such that it cuts off the string in the middle of the seal. Thereafter the filling of the tube with the intended contents begins at the same time as the parts 4, 5, 6, 7, the supporting surfaces 8, 9 and the jaws 10 are brought back to the maximum distance within each pair. The tube with its contents is allowed to descent one package length so that the position shown in FIG. 1 is reached. When the tool parts 4, 5 and 6, 7 in the, next sealing operation are moving closer to each other, they press the tube into a string and essentially presses away its contents. The remains of the contents will be effectively moved to the sides in the longitudinal direction by the pressure and hammering against the string effected by the ultra sonic horn 11 so as to move it to the sides in the longitudinal direction of the string. The movement is thereby most effective if the jaws 10, 11 are immediately pressed against each other with a maximum pressure which is thereafter released in order to give free movement space for the hammer. Closing and cutting is achieved according to what has been described earlier. The process is thereafter repeated by the parts 4, 5, 6, 7, the supporting surfaces 8, 9 and the jaws 10, 11 are retaining their maximum distance and the tube is allowed to descent one package length. The device is equally suitable if the tube is of a pre-produced type or if it is successively produced by edge sealing a band.

In a particularly advantageous embodiment, the jaws 10 and 11 are made with ridges 12 being transversal with respect to the direction of the tube according to FIG. 3 or with a checked pattern. The advantage is thereby firstly, that the melting plastic layer in the tube wall is prevented from escaping out into the package by the ridges of the pattern.

The cutting of the string for separating the packages may of course be carried out outside the device, if the cutting edge 13 for some reason is considered to be inconvenient. Also other modifications such as a slight arc-shape of the working surface of the ultra sonic horn 11 as well as the use of a lower hammering frequency in combination with raised temperature of the jaws 10, 11 is within the scope of the invention.

It should be noted that it is preferred that the tube includes different layers according to the above but that the invention does not exclude that it solely consists of one single layer of a material having the desired melting properties.

What is claimed is:

1. Device for closing packages made from a tubular material, including plastics having plural different melting points, by application of ultrasound to the tube which is compressed to a string, including means for collecting a package tube, which is led through the device, into a string, and means for sealing and cutting this string for forming separate package units, characterized in that V-shaped tool parts (4,5,6,7) for compressing the tube material into a string (3) are arranged on each side of the passage path of the tube, and being moveable against each other in pairs in a transverse direction with respect to the tube, that the pairs of tool parts (4,5 and 6,7), have a mutual distance of about 15–25 mm in the longitudinal direction of the tube and that between the pairs there are arranged on the one hand two supporting surfaces (8,9) for opposing sides of the string (3) and on the other hand two jaws (10,11), being moveable against each other, for ultrasound hammering the string.

2. Device according to claim 1, characterized in that at least one of the jaws (10,11) is provided with ridges (12), which are extending transversal with respect to the string (3).

3. Device according to claim 1, characterized in that at least one of the jaws (10,11) is provided with a checked pattern on the surface turned against the string (3).

4. Device according to claims 1, characterized in that one of the jaws (10,11) is provided with a cutting edge (13) for cutting the string (3).

5. Device according to any of the claims 1, characterized in that the tool parts (4,5,6,7), the supporting surfaces (8,9) and the jaws (10,11) are connected to hydraulic or air pistons, which, in order to achieve the most suitable movement sequence, are controlled by valves in separate supply conduits from a pump or a compressor with a pressure tank.

6. Device for sealing packages made from a tubular material which includes a meltable layer, including means for collecting a package tube which is led through the device into a string, and means for sealing and cutting this string for forming separate package units, characterized in that it includes tool parts (4,5,6,7), for compressing the tube material into a string (3), which are arranged on each side of the passage path of the tube and being moveable relative to each other in a direction which is transverse with respect to the tube, and means for ultrasound hammering the string along plural essentially transversally extending lines as seen in the longitudinal direction of the tube.

7. Method or sealing packages being comprised of a tube, which is continuously filled and is constricted and cut at regular positions, characterized in that the tube is produced from a material including a meltable layer, that the tube at the constricting positions is pressed together into a string, and that along plural lines it is subjected to a high and preferably pulsating pressure or such a magnitude that the meltable layers of the material become adhering.

8. Method according to claim 7, characterized in that the tube is manufactured from a material consisting of plural layers having different melting temperatures, wherein the more easily melted layers become adhering at the application of said pressure.

9. Method according to claim 7, characterized in that the pulsation in pressure is obtained with ultrasound.

10. Method according to claim 7, characterized in that the lines are parallel to each other and essentially transverse with respect to the longitudinal direction of the tube.

11. Method according to any of the claims 7, characterized in that the lines cross each other and that they thereby form a checked pattern.

12. Method according to claim 11, characterized in that the pressure is exerted by a moveable, patterned stamp of metal and an anvil of teflon.

13. Method according to claim 11, characterized in that the anvil is patterned in a manner corresponding to the pattern of the stamp.

14. Method according to claim 11, characterized in that the stamp is held at a constant temperature.

15. Method according to any of the claim 1, characterized in that the anvil is held at a constant temperature.

* * * * *